US012442499B2

(12) United States Patent
Beristany et al.

(10) Patent No.: US 12,442,499 B2
(45) Date of Patent: Oct. 14, 2025

(54) OUTDOOR MOUNTING POST FOR LIGHT FIXTURE

(71) Applicant: Hubbell Incorporated, Shelton, CT (US)

(72) Inventors: Victor Beristany, South Bend, IN (US); Krzysztof Korcz, Granger, IN (US); Krishna Patel, Granger, IN (US)

(73) Assignee: Hubbell Incorporated, Shelton, CT (US)

( * ) Notice: Subject to any disclaimer, the term of this patent is extended or adjusted under 35 U.S.C. 154(b) by 2 days.

(21) Appl. No.: 18/508,690

(22) Filed: Nov. 14, 2023

(65) Prior Publication Data

US 2024/0167652 A1 May 23, 2024

Related U.S. Application Data

(60) Provisional application No. 63/427,595, filed on Nov. 23, 2022.

(51) Int. Cl.
*F21S 8/08* (2006.01)
*F21V 21/08* (2006.01)

(52) U.S. Cl.
CPC .......... *F21S 8/081* (2013.01); *F21V 21/0824* (2013.01)

(58) Field of Classification Search
CPC ....... F21S 8/081; F21S 8/086; F21V 21/0824; F21V 21/10; F21V 21/116; F21V 15/005; F21W 2131/10
See application file for complete search history.

(56) References Cited

U.S. PATENT DOCUMENTS

| | | | | |
|---|---|---|---|---|
| 3,833,804 | A | 9/1974 | Vesely | |
| 6,752,362 | B1 * | 6/2004 | Gretz | F21V 21/116 248/156 |
| 9,648,688 | B2 * | 5/2017 | Beausoleil | G08B 5/36 |
| 2002/0040957 | A1 | 4/2002 | Carter | |
| 2006/0114682 | A1 * | 6/2006 | Schuster | F21S 8/083 362/373 |
| 2007/0258252 | A1 | 11/2007 | Matts et al. | |
| 2012/0020061 | A1 | 1/2012 | Schefers et al. | |

(Continued)

FOREIGN PATENT DOCUMENTS

| | | | |
|---|---|---|---|
| CN | 209839864 | U | 12/2019 |
| JP | 2019-075204 | A | 5/2019 |

OTHER PUBLICATIONS

International Search Report and Written Opinion issued on Apr. 24, 2024, by the International Searching Authority in corresponding International Patent Application No. PCT/US2013/079624. (29 pages).

*Primary Examiner* — Kevin Quarterman
(74) *Attorney, Agent, or Firm* — Robinson + Cole LLP

(57) ABSTRACT

An outdoor mounting assembly for a light fixture includes a post having a hollow cylindrical body section with an upper end and a lower end. A cap is connected to the post. The cap includes a cylindrical body having an upper end with a first opening and a second opening extending non-parallel to the first opening. The second opening aligns with a third opening in the post. A tamper resistant fastener is configured to extend through the second opening and the third opening and engage a light fixture connected to the cap to resist removal of the light fixture from the cap.

20 Claims, 4 Drawing Sheets

(56) References Cited

U.S. PATENT DOCUMENTS

| | | | | |
|---|---|---|---|---|
| 2013/0077327 A1* | 3/2013 | Butler | F21V 23/023<br>362/431 |
| 2016/0161092 A1* | 6/2016 | Scianna | F21V 15/005<br>362/378 |
| 2020/0018465 A1* | 1/2020 | Erdener | H05B 45/38 |

* cited by examiner

OUTDOOR MOUNTING POST FOR LIGHT FIXTURE

RELATED APPLICATION(S)

This application claims priority to U.S. Provisional Application Ser. No. 63/427,595, filed Nov. 23, 2022, the disclosure of which is incorporated herein by reference in its entirety.

FIELD

Various exemplary embodiments relate to mounting posts for external light fixtures, for example flood lights or accent light fixtures designed to illuminate streets, paths, houses, landscapes, parking lots, or other areas.

BACKGROUND

External light fixtures can be used to provide illumination to lawns, homes, landscaping features, and pathways. Mounting posts can be used to during installation of outdoor light fixtures to secure the light fixture at a certain location and to protect outdoor wiring connected to the light fixture.

SUMMARY

In certain configurations, an outdoor mounting assembly for a light fixture includes a cap with a cylindrical cap body having an upper end with a first opening and a second opening extending non-parallel to the first opening. A post has a hollow cylindrical post body with an upper end and a lower end and a third opening extending through the post body. The post is configured to mate with the cap so that the second opening aligns with the third opening. A tamper resistant fastener is configured to extend through the second opening and the third opening and engage a light fixture connected to the cap to resist removal of the light fixture from the cap.

In certain configurations, an outdoor mounting assembly for a light fixture includes a post having a hollow cylindrical post body section with an upper end and a lower end and a post opening extending through the upper end. A cap is connected to the post. The cap includes a cylindrical cap body having an upper end with a device opening and an outer cap opening extending non-parallel to the device opening. The outer cap opening aligns with the post opening. A light fixture is releasably connected to the post and has a mounting portion extending into the device opening. A tamper resistant fastener extends through the outer cap opening and the post opening and engages the mounting portion of the light fixture to resist removal of the light fixture from the cap.

In certain configurations, an outdoor mounting assembly for a device includes a post having a hollow cylindrical post body section with an upper end and a lower end and a post opening extending through the upper end. A cap is connected to the post. The cap includes a cylindrical cap body having an upper end with a device opening and an outer cap opening extending non-parallel to the device opening. The outer cap opening aligns with the post opening. A removable plug is positioned in the device opening. A tamper resistant fastener is configured to extend through the device opening and the outer cap opening and engage a device connected to the cap to resist removal of the device from the cap.

BRIEF DESCRIPTION OF THE DRAWINGS

The aspects and features of various exemplary embodiments will be more apparent from the description of those exemplary embodiments taken with reference to the accompanying drawings.

DETAILED DESCRIPTION OF EXEMPLARY EMBODIMENTS

Figure 1:
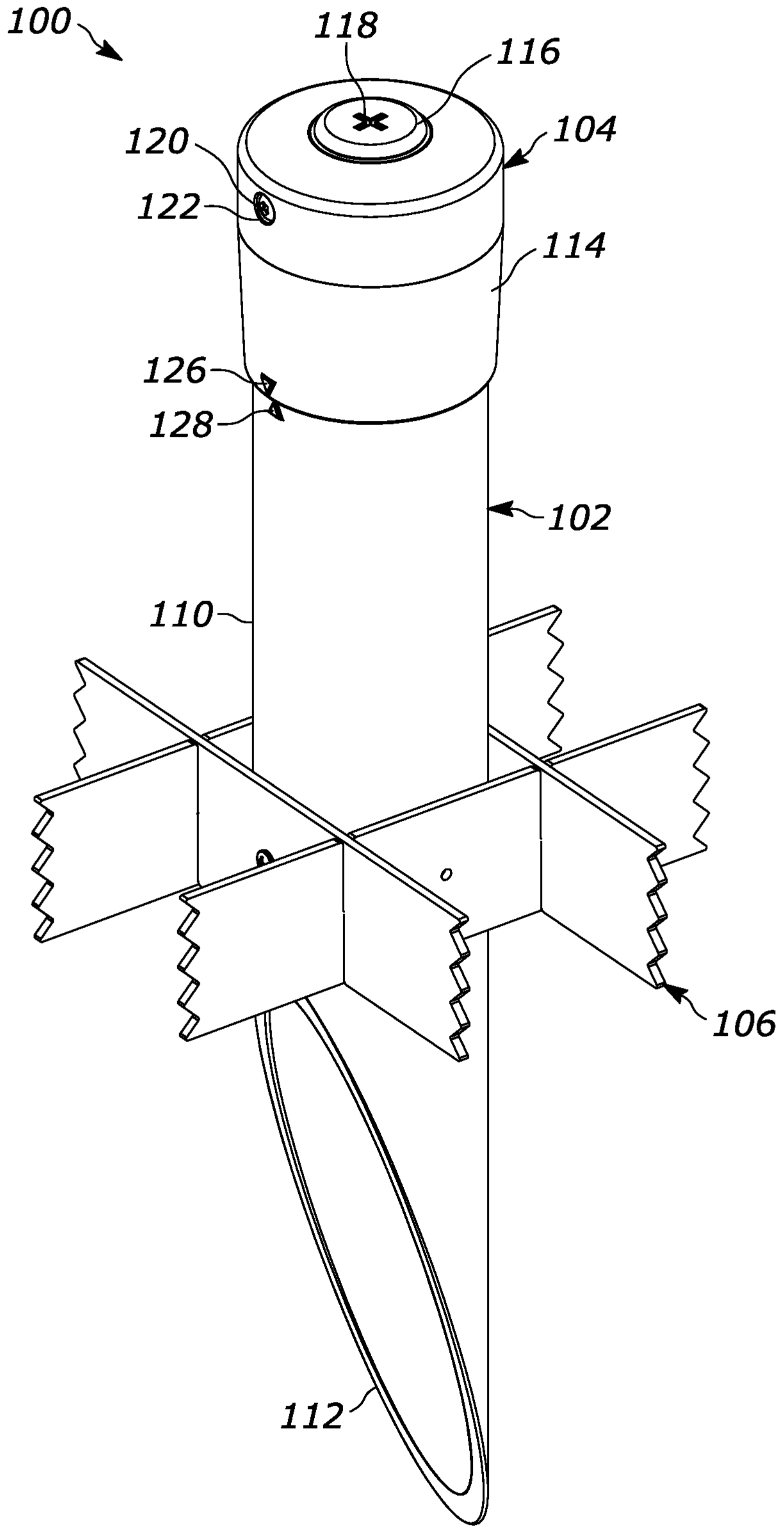
FIG. 1 is a perspective view of an outdoor mounting assembly for a light fixture.
Figure 2:
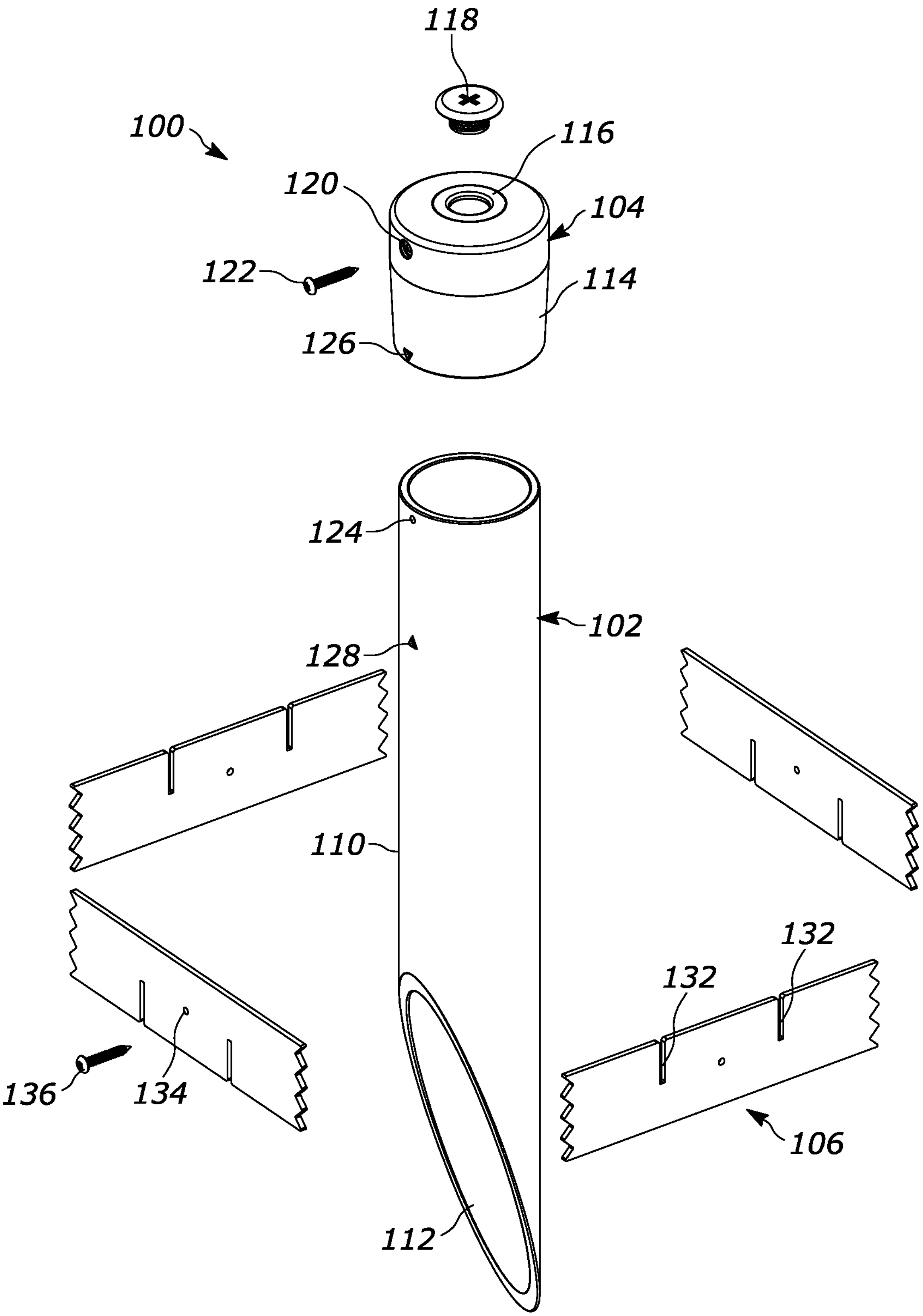
FIG. 2 is an exploded view of FIG. 1.
Figure 3:
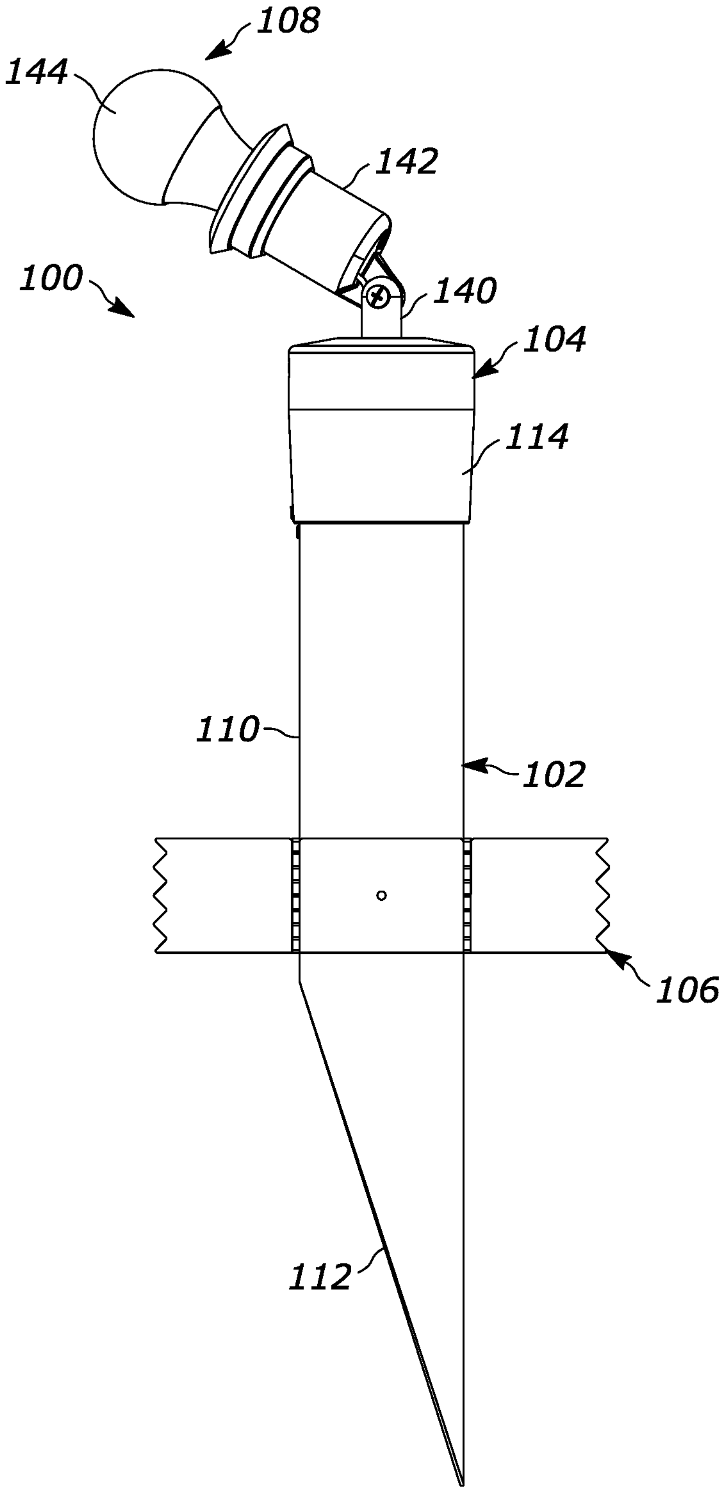
FIG. 3 is a side view of the outdoor mounting assembly with a connected light fixture.

Certain aspects described herein are directed to enhanced security and stability features for outdoor light fixtures. Outdoor light fixtures are typically installed in publically accessible areas, such as lawns for residential applications or along public walkways for commercial applications. Because these light fixtures are accessible to the public, they may be vandalized or stolen.

Various exemplary embodiments are directed to an outdoor light fixture having tamper resistant features to help prevent unauthorized removal or access to various components. The light fixture can have a ground insertion post with a tamper-resistant cap. Indicator features can be provided on the cap to help facilitate installation and alignment of various components. A lighting device can be connected to the post and cap and secured so that unauthorized removal of the light fixture is limited.

FIGS. 1-5 show an exemplary configuration of an outdoor mounting assembly 100 for a light fixture. The illustrated outdoor mounting assembly 100 includes a post 102, a cap 104 connected to the post 102, and one or more stabilizer plates 106. The post 102 can be positioned in the ground and a light fixture 108 can be connected to the post 102 through the cap 104.

In certain configurations, the post 102 includes a hollow cylindrical body 110 having an upper end and a lower end. The lower end can have truncated portion 112 that tapers to a point to help facilitate insertion of the post 102 into the ground. One or more conductors can extend through the body 110 to attach to an associated light fixture 108. The post 102 can be substantially open on both ends to facilitate routing wires through the post body. The post 102 can be made from a polymer material, for example PVC. In other configurations, different materials can be used, and different sizes and shapes of a post 102 can be used depending on the requirements of the light fixture.

In certain configurations, the cap 104 includes a cylindrical body 114 having an upper section with an upper end and a lower section with a substantially open lower end. The upper end includes a first opening or device opening 116. The first opening 116 can receive a removable plug 118. In certain configurations, the cap 104 is made from a polymer material, for example PVC. In other configurations, different materials can be used, and different sizes and shapes of a cap 104 can be used depending on the requirements of the post 102 or the light fixture 108.

The plug 118 can be threadably connected to the cap 104 or connected via an interference fit. An interface can be formed in the plug 118 to facilitate its removal. For example, a tool head interface can be provided to allow for removal of the plug 118 via a standard tool, for example a hex wrench or screwdriver.

A second opening or cap outer opening 120 can be provided in the cap 104 and configured to receive a fastener 122. The second opening 120 can be positioned in the upper section of the cap 104 and can extend through the cap 104 perpendicular to the first opening 116. In other configurations, the second opening 120 can extend at an oblique angle to the first opening 116. The second opening 120 can also be aligned with a third opening or post opening 124 on the post 102. The second and third openings 120, 124 can be threaded or through holes. The fastener 122 can be a threaded fastener or another type of fastener, such as a snap-fit or interference fit fastener depending on the desired configuration.

Figure 4:
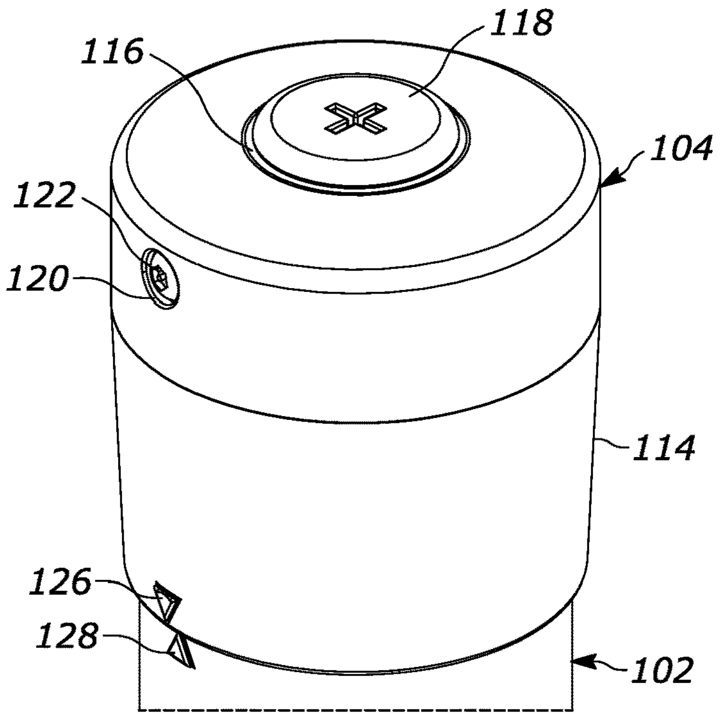
FIG. 4 is an enlarged view of the cap and a portion of the post of the outdoor mounting assembly.

The cap 104 can include a first indicator 126 which is configured to align with a second indicator 128 positioned on the post as best shown in FIG. 4. In the illustrated embodiment, the first and second indicators 126, 128 are depicted as arrows. Other types of indicators can be used as required. The first and second indicators 126, 128 are configured to correspond respectively with the second and third openings 120, 124, such that when the first and second indicators 126, 128 are aligned the second and third openings 120, 124 are aligned for proper insertion of the fastener 122.

In certain configurations, the fastener 122 is a threaded fastener that threadably engages the first and second openings 120, 124 and is configured to extend through the cap 104 and the post 102 and into the post body 110. When the plug 118 is installed, the fastener 122 can engage the plug 118 to prevent removal. When a light fixture 108 is installed to the post 102, the fastener 122 can engage the light fixture 108 to resist or prevent removal. In certain configurations, the fastener 122 can be a tamper-resistant fastener. Tamper-resistant fasteners utilize uncommon bolt heads that cannot be removed with standard screw-drivers or hex wrenches. This helps prevent access as members of the general public do not carry around the tools necessary to remove the fastener. The fastener 122 can also be flush or recessed within an outer surface of the cap 104 to make it less accessible.

One or more stabilizers 106 can also be used with the post 102. In certain configurations, the stabilizers 106 can have a substantially rectangular configuration and four stabilizers 106 can be used to surround the post 102. The stabilizers 106 can each include a pair of slots 132 allowing the stabilizers 106 to slidably engage one another. The stabilizers 106 can also include a stabilizer opening 134 that can receive a stabilizer fastener 136. The stabilizer fastener 136 can act as a set screw to secure the stabilizers 106 to the post 102. The stabilizer fastener 136 could also be a tamper-resistant fastener similar to the fastener 122, which would assist in limiting unauthorized removal of the stabilizers 106 from the post 102. In other configurations, other stabilizers, including fins and anchors can be used with the post in addition the stabilizer plates 106 or separately. These stabilizers can be permanently or removably connected to the post 102.

During installation, stabilizers 106 can be assembled and connected to the post 102. The post 102 can then be inserted into the ground at a desired location. The cap 104 can be connected to the post 102 (before or after insertion) and the plug 118 can be removed. A light fixture 108 can then be connected to the post 102 by insertion into the first opening 116. In some configurations, the light fixture 108 can include a mount 140 which is threadably connected to the first opening 116. A base 142 can be movable connected to the mount 140 and configured to receive a light emitter 144. For example, the base 142 can have a standard Edison screw socket. A wiring connection can be established by running conductors into the post 102 and making an electrical connection with the light fixture 108.

Figure 5:
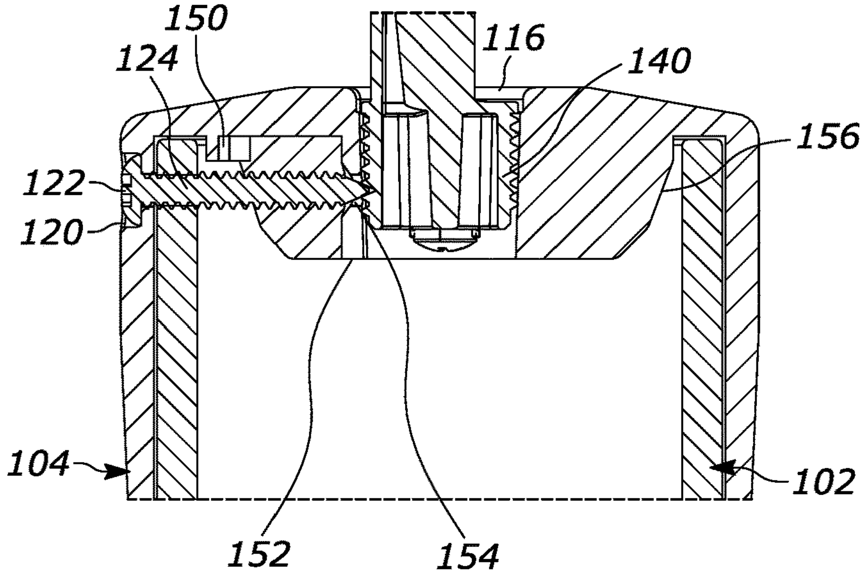
FIG. 5 is a sectional view of a portion of the cap and post of the outdoor mounting assembly.

As best shown in FIG. 5, the fastener 122 can be inserted into the second opening 120 on the cap 104 to pass through the cap 104 and into the post 102 to engage the light fixture 108. For example the fastener 122 can engage a portion of the mount 140 of the light fixture 108 positioned in post 102. The engagement of the fastener 122 can help prevent removal of the light fixture 108. Use of tamper-resistant fastener can further impede unintended removal of the light fixture 108.

In certain configurations, the cap 104 includes an outer rim 150 and inner rim 152. The top of the post 102 is configured to fit between the outer wall of the cap 104 and the outer rim 150. The inner rim 152 can include an inner opening 154 that is aligned with the outer second opening 120. The inner opening 154 can have a counter-sink or counter-bore opening to help facilitate blind insertion of the fastener 122. The outer opening 120 can also have a counter-sink or counter-bore opening so that the head of the fastener 122 fits flush or is recessed from the outer surface of the cap 104.

One or more ribs 156 can extend between the outer rim 150 and the inner rim 152 to help provide support to the cap. In the illustrated embodiment, four ribs 156 are used arrayed in a circular pattern around the device opening 116, although fewer or more ribs 156 can be used. The fastener openings 120, 124, 154 can be positioned to be aligned in between two of the ribs 156.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present disclosure, and are not intended to limit the structure of the exemplary embodiments of the present disclosure to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments. Unless specified or limited otherwise, the terms "mounted," "connected," "supported," and "coupled" and variations thereof are used broadly and encompass both direct and indirect mountings, connections, supports, and couplings.

What is claimed:

1. An outdoor mounting assembly for a light fixture comprising:

a cap including a cylindrical cap body having an upper end with a first opening and a second opening extending non-parallel to the first opening;

a post having a hollow cylindrical post body with an upper end and a lower end and a third opening extending through the hollow cylindrical post body, wherein the post is configured to mate with the cap so that the second opening aligns with the third opening; and a tamper resistant fastener configured to extend through the second opening and the third opening and engage a light fixture connected to the cap to resist removal of the light fixture from the cap.

2. The outdoor mounting assembly for a light fixture of claim 1, wherein the lower end of the post includes a truncated portion that tapers to a point.

3. The outdoor mounting assembly for a light fixture of claim 1, wherein the first opening is configured to receive the light fixture.

4. The outdoor mounting assembly for a light fixture of claim 1, wherein a removable plug is positioned in the first opening.

5. The outdoor mounting assembly for a light fixture of claim 4, wherein the plug is threadably connected to the cap.

6. The outdoor mounting assembly for a light fixture of claim 1, wherein the cap includes a first indicator and the post includes a second indicator, and wherein when the first indicator is aligned with the second indicator the second opening is aligned with the third opening.

7. The outdoor mounting assembly for a light fixture of claim 1, further comprising one or more stabilizers connected to the post.

8. The outdoor mounting assembly for a light fixture of claim 1, wherein the cap includes a fourth opening aligned with the second opening and wherein the fastener is configured to extend through the second, third, and fourth openings.

9. An outdoor mounting assembly for a light fixture comprising:

a post having a hollow cylindrical post body section with an upper end and a lower end and a post opening extending through the upper end;

a cap connected to the post, the cap including a cylindrical cap body having an upper end with a device opening and an outer cap opening extending non-parallel to the device opening, wherein the outer cap opening aligns with the post opening;

a light fixture releasable connected to the post having a mounting portion extending into the device opening; and a tamper resistant fastener extending through the outer cap opening and the post opening and engaging the mounting portion of the light fixture to resist removal of the light fixture from the cap.

10. The outdoor mounting assembly for a light fixture of claim 9, wherein the cap includes a first indicator and the post includes a second indicator, and wherein when the first indicator is aligned with the second indicator the outer cap opening is aligned with the post opening.

11. The outdoor mounting assembly for a light fixture of claim 9, further comprising one or more stabilizers connected to the post.

12. The outdoor mounting assembly for a light fixture of claim 9, wherein the outer cap opening has a recessed section to receive a head of the fastener.

13. The outdoor mounting assembly for a light fixture of claim 9, wherein the cap includes an inner rim and an outer rim, and wherein the outer rim includes an inner cap opening for receiving the fastener.

14. The outdoor mounting assembly for a light fixture of claim 13, further comprising a rib extending between the inner rim and the outer rim.

15. The outdoor mounting assembly for a light fixture of claim 9, wherein the mounting portion is threadably connected to the device opening.

16. An outdoor mounting assembly for a device comprising:

a post having a hollow cylindrical post body section with an upper end and a lower end and a post opening extending through the upper end;

a cap connected to the post, the cap including a cylindrical cap body having an upper end with a device opening and an outer cap opening extending non-parallel to the device opening, wherein the outer cap opening aligns with the post opening;

a removable plug is positioned in the device opening; and a tamper resistant fastener configured to extend through the device opening and the outer cap opening and engage a device connected to the cap to resist removal of the device from the cap.

17. The outdoor mounting assembly for device of claim 16, wherein the cap includes a first indicator and the post includes a second indicator, and wherein when the first indicator is aligned with the second indicator the outer cap opening is aligned with the post opening.

18. The outdoor mounting assembly for a device of claim 16, wherein the cap includes an inner rim and an outer rim, and wherein the outer rim includes an inner cap opening for receiving the fastener.

19. The outdoor mounting assembly for a device of claim 18, wherein the post is received in the cap so that the upper end of the post is positioned between the outer rim and an outer wall of the cap.

20. The outdoor mounting assembly for a device of claim 18, wherein the plug is threadably connected to the device opening.

* * * * *